(12) United States Patent
Lee

(10) Patent No.: US 7,801,557 B2
(45) Date of Patent: Sep. 21, 2010

(54) APPARATUS AND METHOD FOR SELECTIVELY CONNECTING MOBILE COMMUNICATION TERMINAL TO TELEPHONE NETWORK

(75) Inventor: Hun-Soo Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 11/245,927

(22) Filed: Oct. 7, 2005

(65) Prior Publication Data

US 2006/0084467 A1    Apr. 20, 2006

(30) Foreign Application Priority Data

Oct. 9, 2004    (KR) ...................... 10-2004-0080750

(51) Int. Cl.
    H04M 1/00    (2006.01)
    H04W 4/00    (2009.01)
(52) U.S. Cl. ................ 455/552.1; 455/426.1; 455/41.1; 370/338
(58) Field of Classification Search .............. 455/552.1, 455/62, 404.1, 553.1, 426.1
    See application file for complete search history.

(56) References Cited

U.S. PATENT DOCUMENTS

| | | | | |
|---|---|---|---|---|
| 4,989,230 | A * | 1/1991 | Gillig et al. ............... | 455/552.1 |
| 5,673,308 | A * | 9/1997 | Akhavan ..................... | 455/461 |
| 6,445,921 | B1 * | 9/2002 | Bell ........................ | 455/426.1 |
| 6,522,894 | B1 * | 2/2003 | Schmidt ................... | 455/552.1 |
| 6,708,028 | B1 * | 3/2004 | Byrne ...................... | 455/426.1 |
| 2002/0037715 | A1 * | 3/2002 | Mauney et al. .............. | 455/421 |
| 2002/0049073 | A1 * | 4/2002 | Bell ........................... | 455/552 |
| 2002/0065076 | A1 * | 5/2002 | Monroe ....................... | 455/426 |
| 2002/0102974 | A1 * | 8/2002 | Raith .......................... | 455/434 |
| 2003/0050090 | A1 * | 3/2003 | Raffel et al. ................. | 455/552 |
| 2003/0078071 | A1 * | 4/2003 | Uchiyama ................... | 455/557 |
| 2005/0107144 | A1 * | 5/2005 | Dvorak .................... | 455/575.6 |

FOREIGN PATENT DOCUMENTS

CN    1116396         2/1996
EP    0660626 A2 *    6/1995

* cited by examiner

Primary Examiner—Lester Kincaid
Assistant Examiner—Daniel Lai
(74) Attorney, Agent, or Firm—Lee, Hong, Degerman, Kang & Waimey

(57) ABSTRACT

A mobile communication terminal includes an input unit having a plurality of number keys and a plurality of call keys; a controller for instructing a call connection to a wired communication network or to a mobile communication network with reference to a 'telephone network connection method' arbitrarily set by a user when a phone number of a receiving side and a specific call key are inputted through the input unit; a mobile communication network connection unit for attempting a connection to the mobile communication network according to an instruction from the controller; and a wired communication network connection unit for attempting a connection to the wired communication network according to an instruction from the controller. The mobile communication terminal is implemented to be connected with the wired communication network through the AP installed in a building (or in a room), for which a subscriber can arbitrary set the telephone network connection method, simplifying the procedure for selectively connecting to the mobile communication network (the CDMA network) and the PSTN. Thus, the subscriber can easily and conveniently operate the mobile communication terminal.

17 Claims, 5 Drawing Sheets

APPARATUS AND METHOD FOR SELECTIVELY CONNECTING MOBILE COMMUNICATION TERMINAL TO TELEPHONE NETWORK

CROSS REFERENCE TO RELATED APPLICATIONS

Pursuant to 35 U.S.C. §119(a), this application claims the benefit of earlier filing date and right of priority to Korean Application No. 10-2004-80750, filed on Oct. 9, 2004, the contents of which are hereby incorporated by reference herein in their entirety.

BACKGROUND OF THE INVENTION

1. Field of the Invention

The present invention relates to a mobile communication terminal and, more particularly, to an apparatus for allowing a mobile communication terminal to be selectively connected with either a wired communication network or a mobile communication network.

2. Description of the Background Art

FIG. 1 illustrates a general mobile communication system.

When a subscriber being indoors (e.g., in a house or in a building) makes a call to talk on the phone with a friend or a family member, as shown in FIG. 1, the subscriber can be connected with a telephone network 100 (wired communication network) through a fixed line communication terminal 210 (e.g., a fixed line phone) or can be connected with a telephone network 200 (mobile communication network) through a mobile communication terminal 10.

While staying indoors, the subscriber can preferably use the fixed line terminal 210, but for making private and secret calls, the subscriber may choose to use the mobile communication terminal 10. Namely, subscribers are generally expected to use both types of communication devices, namely, the mobile communication terminal and the fixed line terminal.

According to the rapid advancement of mobile communication technologies and widespread usage of mobile communication terminals, the subscribers for mobile communication networks may outnumber the subscribers for traditional wired communication networks (or this phenomenon is anticipated to be true in the near future). Accordingly, the communications environment centering on the fixed line communication is changing over to a mobile communication-oriented environment.

In general, each home has communication devices (mobile communication terminals and fixed line terminals) corresponding to the number of family members. Even some households may have more communication terminals than the number of family members. That is, although each member owns his/her mobile terminal, family members may additionally keep and use a fixed line terminal in each room or in the living room due to its relatively low telephone charges compared with that of mobile communication terminals.

However, separately using of the mobile communication terminal and the fixed line terminal at homes or in offices is not economical and causes much inconvenience to the users.

SUMMARY OF THE INVENTION

Therefore, one object of the present invention is to provide an apparatus and method for selectively connecting a mobile communication terminal to a telephone network, whereby be the mobile communication terminal can be connected with a wired communication network as well as with a mobile communication network.

Another object of the present invention is to provide a mobile communication terminal capable of being selectively connected with a telephone network (mobile communication network or wired communication network) according to a telephone network connection method set by a subscriber.

Still another object of the present invention is to provide an apparatus and method for selectively connecting a mobile communication terminal with a telephone network, whereby a subscriber can be connected with the telephone network through simple manipulation.

To achieve at least the above objects in whole or in parts, there is provided a mobile communication terminal including: an input unit having a plurality of number keys and a plurality of call keys; a controller for instructing a call connection to a wired communication network or to a mobile communication network with reference to a 'telephone network connection method' arbitrarily set by a user when a phone number of a receiving side and a specific call key are inputted through the input unit; a mobile communication network connection unit for attempting a connection to the mobile communication network according to an instruction from the controller; and a wired communication network connection unit for attempting a connection to the wired communication network according to an instruction from the controller.

Preferably, when the inputted call key requests a connection to the mobile communication network and the telephone network connection method is set as 'mobile communication network only', the controller attempts a connection to the mobile communication network, and when the connection to the mobile communication network is failed, the controller stops attempting the connection to the telephone network.

Preferably, when the inputted call key requests a connection to the mobile communication network and the telephone network connection method is set as 'wired communication network & mobile communication network', the controller first attempts a connection to the wired communication network, and when the connection to the wired communication network is failed, the controller attempts a connection to the mobile communication network.

Preferably, when the inputted call key requests a connection to the wired communication network, the controller attempts a connection to the wired communication network regardless of a set value of the telephone network connection method, and when the connection to the wired communication network is failed, the controller stops attempting the connection to the telephone network.

Preferably, the plurality of call keys include a first call key for requesting a connection to the mobile communication network; and a second call key for requesting a connection to the wired communication network.

Preferably, the wired communication network connection unit attempts a call connection to the wired communication network by being wirelessly connected with an access point (AP).

Preferably, the wired communication network connection unit is wirelessly connected with an AP by using BLUETOOTH™ (BLUETOOTH is a registered trademark of the BLUETOOTH Special Interest Group).

To achieve at least these advantages in whole or in parts, there is further provided a method for selectively connecting to a telephone network by a mobile terminal, including: receiving a phone number of a receiving side and a call key; checking the received call key and attempting a connection to a wired communication network or to a mobile communication network with reference to a 'telephone network connection method' arbitrarily set by a user; and performing call setup with the receiving side when the attempted connection is successfully made.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Some embodiments of the present invention will now be described with reference to the accompanying drawings.

Figure 1:
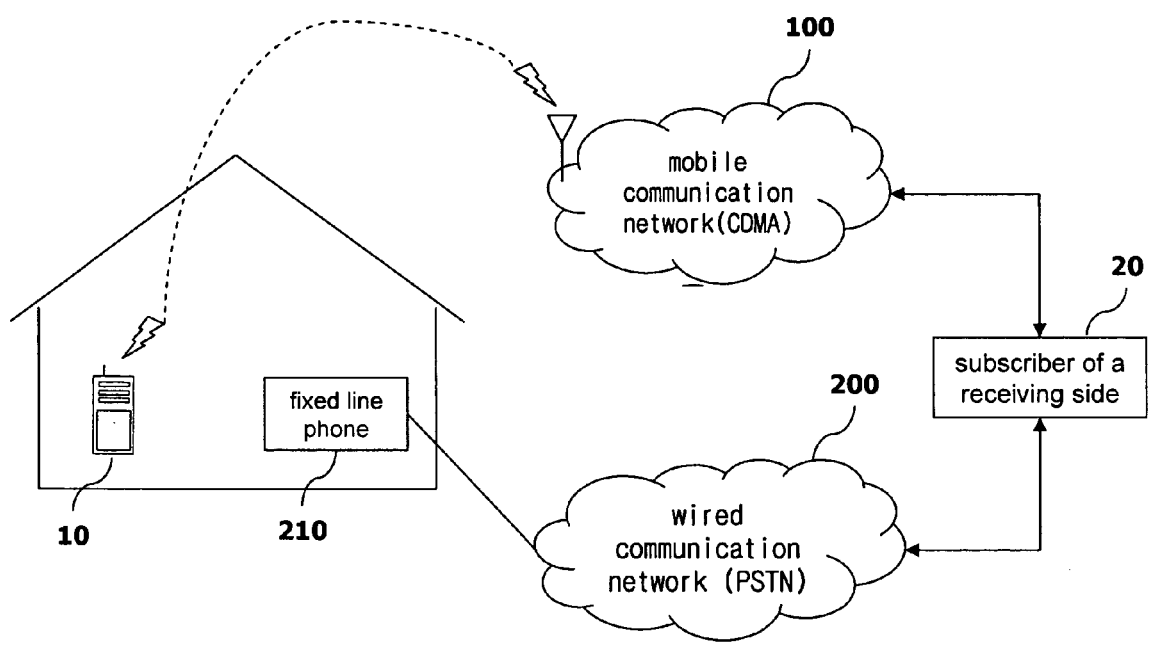
FIG. 1 illustrates a typical mobile communication system.
Figure 2:
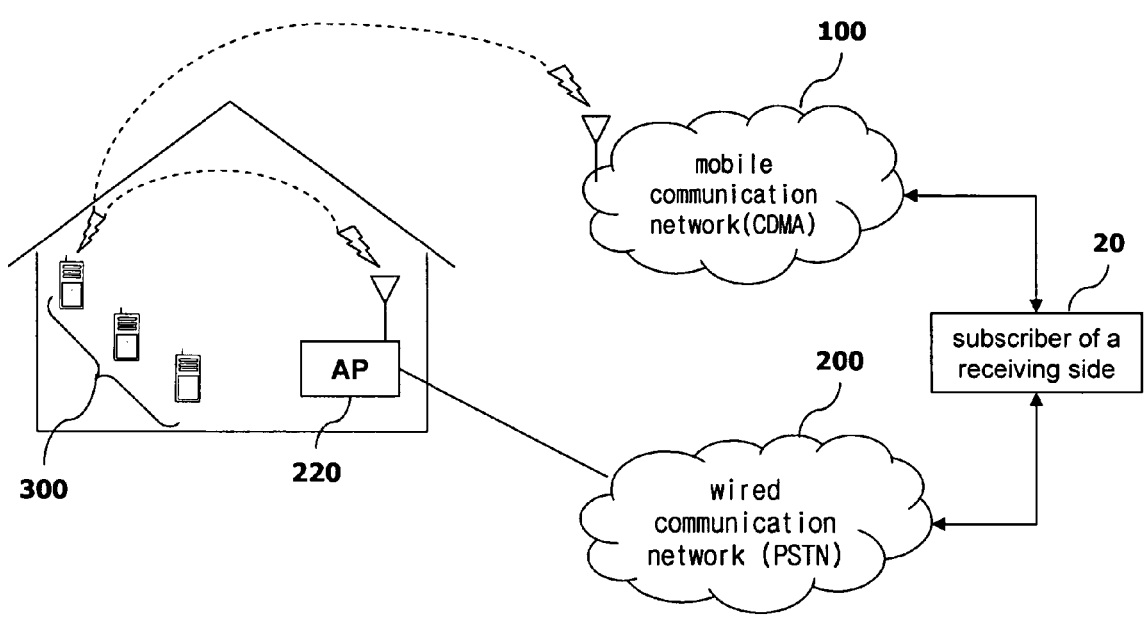
FIG. 2 illustrates a mobile communication system in accordance with a an exemplary embodiment of the present invention.

FIG. 2 illustrates a mobile communication system in accordance with an exemplary embodiment of the present invention.

As shown in FIG. 2, a mobile communication system in accordance with one embodiment of the present invention includes a wired communication network (e.g., a PSTN (Public Switched Telephone Network)) 200, a mobile communication network (e.g., a CDMA (Code Division Multiple Access)) network, one or more mobile communication terminals 300 for performing a call service by being connected with the PSTN 200 or the CDMA network 100 according to a subscriber selection, and an AP (Access Point) 220, namely, an end connection means of the PSTN 200 installed in a house of a subscriber, for connecting the wired communication network 200 and the mobile communication terminal 300 in a wireless communication manner (e.g., BLUETOOTH).

When a subscriber wants to set up a call through the CDMA network 100, the mobile communication terminal 300 is connected with the CDMA network 100 and performs call communication with a subscriber 20 of a receiving side. Meanwhile, when the subscriber wants to set up a call through the PSTN, the mobile communication terminal 300 attempts a connection to the AP 220 in using wireless (BLUETOOTH) connectivity. When the connection to the AP 200 is successful, the subscriber sets up a call with the subscriber of the receiving side through the PATN 200 and performs a call service.

In this respect, however, if a person in the same house has been already connected with the PSTN 200 through the AP 220 or if the mobile communication terminal 300 is outside the coverage area for a wireless connection with the AP 220, the mobile communication terminal 300 fails to connect with the PSTN. Then, the mobile communication terminal 300 immediately attempts a connection to the CDMA network. When the connection with the CDMA is successfully made, the mobile communication terminal sets up a call with the subscriber of the receiving side through the CDMA network 100, and performs a call service therethrough.

Figure 3:
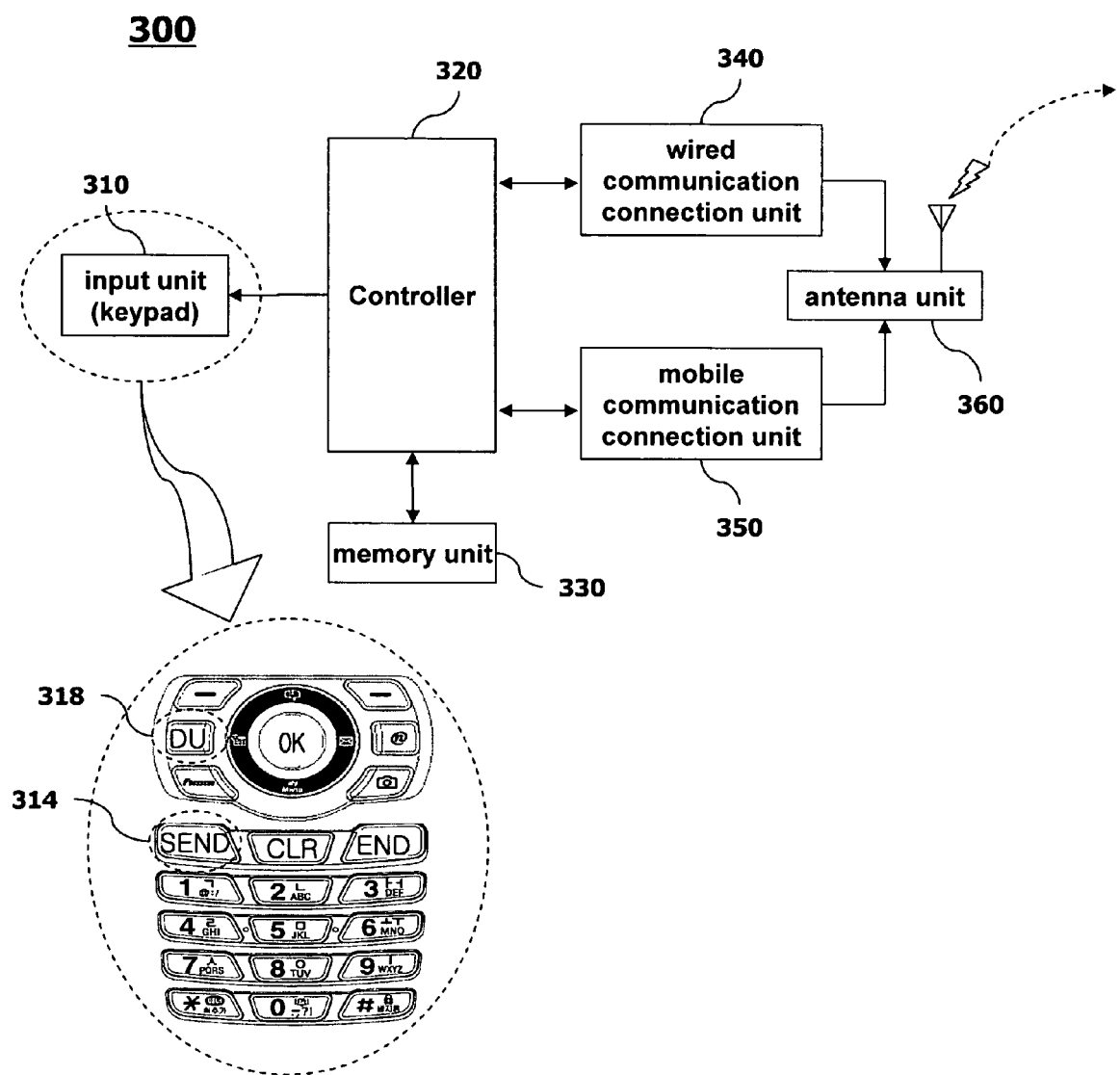
FIG. 3 illustrates a schematic block diagram of a mobile communication terminal in accordance with an exemplary embodiment of the present invention.

FIG. 3 illustrates a schematic block diagram of a mobile communication terminal in accordance with an exemplary embodiment of the present invention.

As shown in FIG. 3, the mobile communication terminal includes: an input unit 310 having a plurality of number keys and call keys; a controller 320 for instructing a connection to the PSTN or to the CDMA network with reference to a 'telephone network connection information' stored in a memory 330 when a phone number of a receiving side and a specific call key are inputted through the input unit 310; a mobile communication network connection unit (referred to hereinafter as 'CDMA connection unit') 350 for attempting a connection to the CDMA network according to an instruction of the controller 320; and a wired communication network connection unit (referred to hereinafter as 'PSTN connection unit') 340 for attempting a PSTN connection according to an instruction of the controller 320.

The input unit 310 includes a first call key (or SEND key) 314 for transferring a user instruction requesting connection to the CDMA network 100 and performing a call service to the controller 320 and a second call key 318 for transferring a user instruction requesting connection to the PSTN 200 and performing a call service to the PSTN 200.

Figure 4:
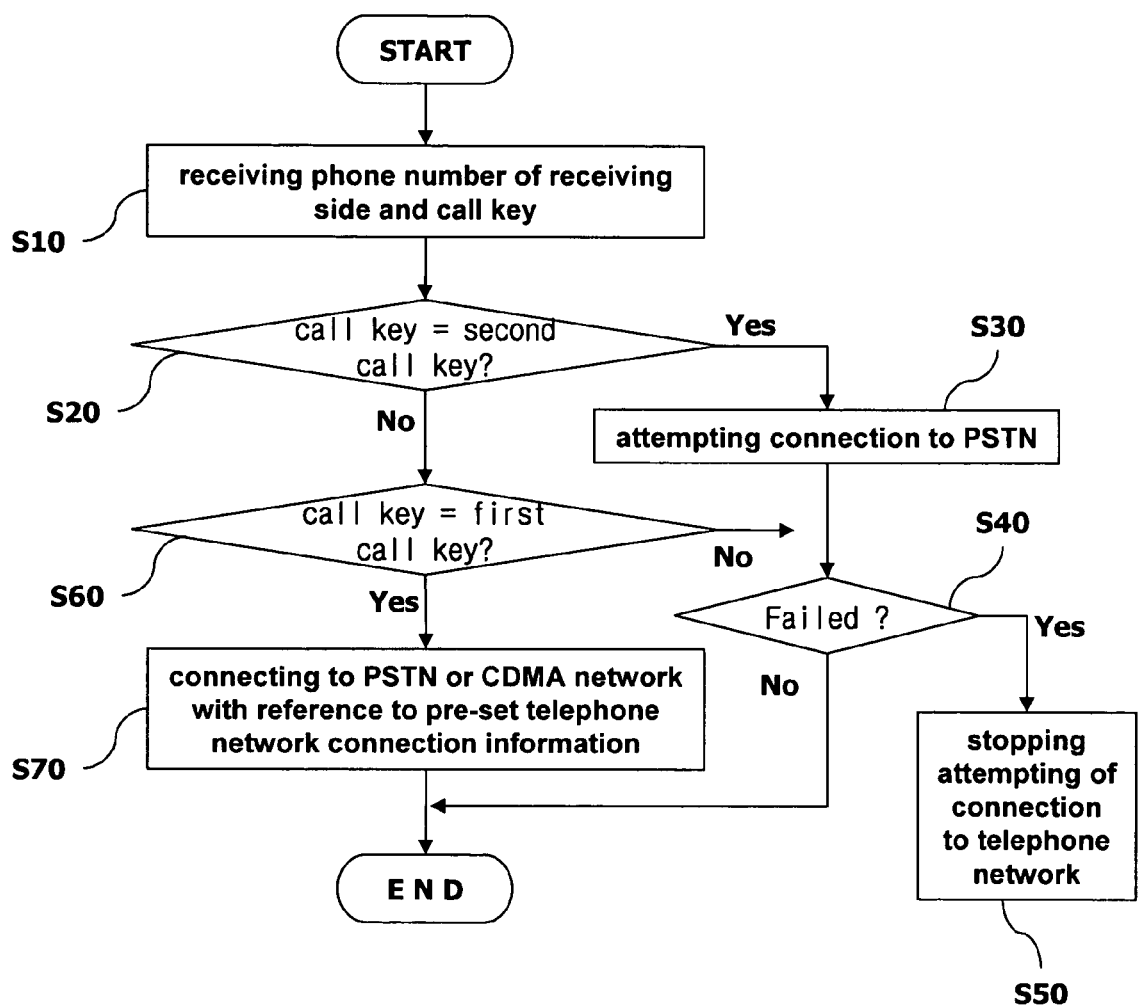
FIG. 4 is a flow chart illustrating the processes of a telephone network connection method of the mobile communication terminal in accordance with an exemplary embodiment of the present invention.
Figure 5:
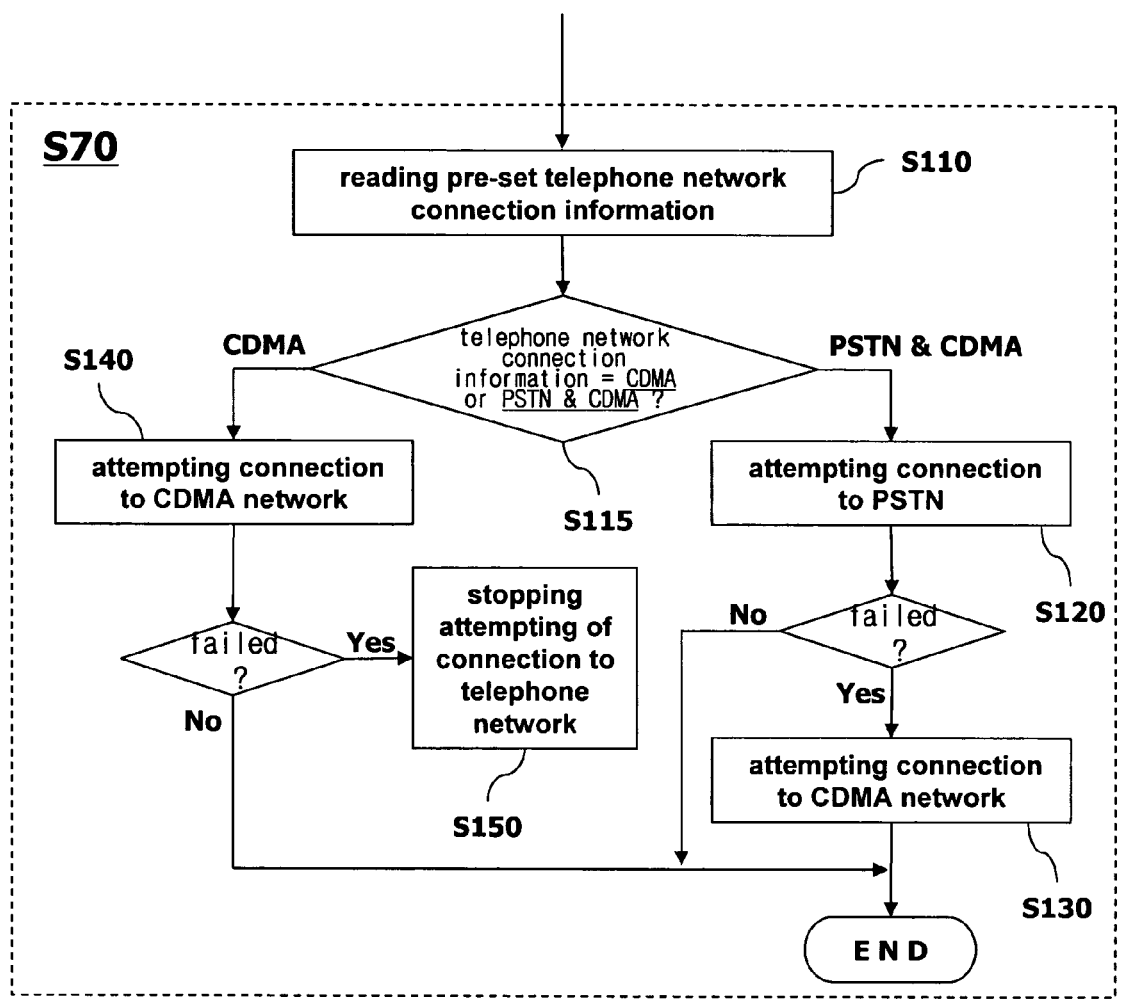
FIG. 5 is a detailed flow chart of the step S70 in FIG. 4.

FIGS. 4 and 5 are flow charts illustrating the processes of a telephone network connection method of the mobile communication terminal in accordance with an exemplary embodiment of the present invention.

Before using the mobile communication terminal 300, the subscriber sets certain telephone network connection information. Setting of the telephone network connection information is required for simplifying a telephone network connection procedure and preventing a telephone network connection contrary to an intention of the subscriber (e.g., intention for reduction of a telephone charge or an immediate call).

If someone else is being connected with the PSTN 200 through the AP 220 or the mobile communication terminal 300 is outside the coverage area for wireless connection with the AP 220, the additional PSTN connection is bound to be failed. If the subscriber wants to make an immediate call, the subscriber should input the first call key 314 in a state that the telephone network connection information has been already set as 'CDMA'. Then, the mobile communication terminal 300 can attempt a connection directly to the CDMA network without having to attempt connection to the PSTN 200.

In a typical case, the telephone network connection information is set as 'PSTN & CDMA'. With the telephone network connection information set as the 'PSTN & CDMA', when the first call key 314 is inputted, the mobile communication terminal 300 attempts a connection first to the PSTN 200, and if the connection fails, the mobile communication terminal 300 attempts a connection to the CDMA network 100.

If the subscriber wants a low-cost call, the subscriber can input the second call key 318. When the second call key 318 is inputted, the mobile communication terminal 300 attempts the connection only to the PSTN 200 regardless of the set value of the telephone network connection information, to thus prevent a connection to the CDMA network 300 contrary to an intention (the low-cost call) of the subscriber.

Setting the telephone network connection information by the user is one of features of the present invention, and the controller 320 stores the set telephone network connection information in the memory 320.

The operation of the mobile communication terminal performing the selective telephone network connection will now be described in detail with reference to FIGS. 3 to 5.

As shown in FIG. 4, when the subscriber inputs a phone number of a receiving side by pressing number keys and then presses the first call key 314 or the second call key 318 (step S10), the input unit 310 transfers corresponding electrical signals of the pressed keys to the controller 320. In this case, the subscriber can input the phone number of the receiving side by using a phone number shortened key or can input the phone number through searching a phone book.

When the electrical signals of the phone number of the receiving side and the first call key 314 are received from the input unit 310, the controller 320 determines whether to connect to the CDMA network 100 or to the PSTN 200 with reference to the telephone network connection information stored in the memory 330.

If the telephone network connection information is set as 'PSTN & CDMA' when the first call key 314 is received from the input unit 310 (step S60), the controller 320 instructs the PSTN connection unit 340 to be connected with the PSTN 200 to set up a call with the receiving side. Upon receiving the instruction from the controller 320, the PSTN connection unit 340 attempts a connection to the PSTN 200 through the AP 220 (step S110, S115 and S120).

If the PSTN connection unit 340 fails to connect with the PSTN 200, the controller 320 stops the operation of the PSTN connection unit 340 and instructs the CDMA connection unit 350 to be connected with the CDM network 100 for setting up a call with the receiving side. Upon receiving the instruction from the controller 320, the CDMA connection unit 350 attempts a connection to the CDMA network 100 (step S130).

However, when the first call key 314 is received from the input unit 310 (step S60), if the telephone network connection information is set as 'CDMA', the controller 320 instructs the CDMA connection unit 350 to be connected with the CDMA network 100. Upon receiving the instruction from the controller 320, the CDMA connection unit 350 attempts a connection to the CDMA network 100 (steps S10, S115 and S140). If the CDMA connection unit 350 fails to connect with the CDMA network 100, the controller 320 stops the operation of the CDMA connection unit 350 to quit further attempts to make a telephone network connection.

Meanwhile, when the signals related to the phone number of the receiving side and the second call key 318 are received from the input unit 310 (step S20), the controller 320 instructs the PSTN connection unit 340 to be connected with the PSTN 200 for a call setup with the receiving side regardless of the set value of the telephone network connection information. Upon receiving the instruction from the controller 320, the PSTN connection unit 340 attempts a connection to the PSTN 200 through the AP 220 (step S30).

If the PSTN connection unit 340 fails to connect with the PSTN 200, the controller stops the operation of the PSTN connection unit 340 to quit further attempts to make the telephone network connection (step S50).

As so far described, the apparatus and method for selectively connecting a telephone network by a mobile communication terminal in accordance with the present invention have many advantages.

For example, the mobile communication terminal is implemented to be connected with the wired communication network through the AP installed in a building (or in a room), for which a subscriber can set the telephone network connection method, thus simplifying the procedure for selectively connecting to the mobile communication network (the CDMA network) and the PSTN. Thus, the subscriber can easily and conveniently operate the mobile communication terminal via a wired or mobile communications network.

In addition, because the telephone network connection method is previously set, even when the mobile communication terminal fails to be connected with the wired communication network, the mobile communication terminal is not automatically connected with the mobile communication terminal contrary to the intension of the subscriber, unlike in the related art.

The foregoing embodiments and advantages are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication terminal comprising:

an input unit comprising a first call key associated with a mobile communication network and a second call key associated with a wired communication network;

a controller for initiating a connection to the wired communication network or the mobile communication network according to the first call key or the second call key selected via a user input, and presetting a telephone network connection as one of the mobile communication network, the wired communication network, or a combination mobile and wired communication network;

a mobile communication network connection unit for attempting a connection to the mobile communication network in response to an instruction from the controller; and a wired communication network connection unit for attempting a connection to the wired communication network in response to an instruction from the controller, wherein the mobile communication network connection unit does not require a mobile communication terminal to be present in a base station in order to connect to the mobile communication network, wherein selecting the second call key controls the controller to initiate a connection to the wired communication network regardless of a preset value of the telephone network connection, such that a failed initiation of the connection to the wired communication terminal will terminate successive attempts to initiate the connection to the wired communication network, wherein presetting the telephone network connection to the mobile communication network and selecting the first call key controls the controller to initiate a connection to the mobile communication network, such that a failed initiation of the connection to the mobile communication terminal will terminate successive attempts to initiate the connection to the mobile communication network, wherein presetting the telephone network connection to the combination mobile and wired communication network and selecting the first call key controls the controller to initiate a connection to the mobile communication network, such that a failed initiation of the connection to the mobile communication terminal will terminate successive attempts to initiate the connection via either the mobile communication network or the wired communication network.

2. The mobile communication terminal of claim 1, wherein presetting the telephone network connection to the combination mobile and wired communication network and selecting the second call key controls the controller to initiate a connection to the wired communication network, such that a failed initiation of the connection to the wired communication controls the controller to initiate a connection to the mobile communication network.

3. The mobile communication terminal of claim 1, wherein the first call key is a SEND key.

4. The mobile communication terminal of claim 1, wherein the second call key is a combination of a SEND key and a specific key for a wired communication.

5. The mobile communication terminal of claim 1, wherein the controller initiates a connection to the wired communication network or a connection to the mobile communication network with reference to the preset telephone network connection if a phone number shortened key and a specific call key are input via the input unit.

6. The mobile communication terminal of claim 5, wherein the controller receives the phone number from a phone book.

7. The mobile communication terminal of claim 1, wherein the wired communication network connection unit attempts a call connection to the wired communication network by wirelessly connecting with the base station.

8. The mobile communication terminal of claim 1, wherein the wired communication network connection unit is wirelessly connected with the base station by using BLUETOOTH® technology.

9. The mobile communication terminal of claim 1, wherein the mobile communication network is a code division multiple access network.

10. The mobile communication terminal of claim 1, wherein the wired communication network is a public switched telephone network.

11. A method for selectively connecting a mobile terminal to a telephone network, the method comprising:
presetting a telephone network connection as one of a mobile communication network, a wired communication network, or a combination wired and mobile communication network;
receiving a phone number of a receiving side;
selecting a first call key associated with the mobile communication network or a second call key associated with the wired communication network;
initiating a connection to the wired communication network or the mobile communication network according to the preset telephone network connection and the selected first call key or second call key; and
performing a call setup with the receiving side when the connection is successful,
wherein the connection with the mobile communication network does not require a mobile handset to be present in a base station,
wherein presetting the telephone network connection to the combination wired and mobile communication network and selecting the first call key initiates a connection to the mobile communication network, such that a failed initiation of the connection to the mobile communication terminal will terminate successive attempts to initiate the connection via either the mobile communication network or the wired communication network,
wherein the connection to the mobile communication network is initiated if the first call key is selected and the preset telephone network connection is the mobile communication network and the controller does not perform successive initiations to connect to the mobile communication network if the initiation for the connection to the mobile communication network failed, and
wherein regardless of the preset value of the telephone network connection, the connection to the wired communication network is initiated if the second call key is selected, and the controller does not perform successive initiations to connect to the wired communication network if the initiation for the connection to the wired communication network failed.

12. The method of claim 11, wherein presetting the telephone network connection method to the combination wired and mobile communication network and selecting the second call key initiates a connection to the wired communication network, such that a failed initiation of the connection to the mobile communication terminal will initiate a connection via the mobile communication network.

13. The method of claim 11, wherein the first call key is a SEND key.

14. The mobile communication terminal of claim 11, wherein the second call key is a combination of a SEND key and a specific key for a wired communication.

15. The method of claim 11, wherein the phone number of the receiving side is received from a phone book.

16. The method of claim 11, wherein the mobile communication network is a code division multiple access network.

17. The method of claim 11, wherein the wired communication network is a public switched telephone network.

* * * * *